United States Patent [19]

Goldner et al.

[11] Patent Number: 5,532,869
[45] Date of Patent: Jul. 2, 1996

[54] TRANSPARENT, ELECTRICALLY-CONDUCTIVE, ION-BLOCKING LAYER FOR ELECTROCHROMIC WINDOWS

[75] Inventors: Ronald B. Goldner, Lexington; Semyon Slaven, Newton, both of Mass.

[73] Assignee: Tufts University, Medford, Mass.

[21] Appl. No.: 235,255

[22] Filed: Apr. 29, 1994

[51] Int. Cl.⁶ ................................................. G02F 1/153
[52] U.S. Cl. ................................................................ 359/275
[58] Field of Search .................................... 359/275, 270, 359/265

[56] References Cited

U.S. PATENT DOCUMENTS

| | | | |
|---|---|---|---|
| 4,832,463 | 5/1989 | Goldner et al. | 359/275 |
| 4,876,628 | 10/1989 | Goldner et al. | 361/313 |
| 4,939,043 | 7/1990 | Biricik | 428/620 |
| 5,133,594 | 7/1992 | Haas et al. | 359/275 |
| 5,171,413 | 12/1992 | Arntz et al. | 204/192.15 |
| 5,187,547 | 2/1993 | Niina et al. | 257/77 |
| 5,206,756 | 4/1993 | Cheshire | 356/265 |

OTHER PUBLICATIONS

Goldner et al., "Nuclear reaction analysis profiling as direct evidence for lithium ion mass transport in thin film 'rocking-chair' structures," Appl. Phys. Lett., vol. 62, No. 14, pp. 1699–1701 (Apr. 5, 1993).

Primary Examiner—Paul M. Dzierzynski
Assistant Examiner—Audrey Chang
Attorney, Agent, or Firm—Kriegsman & Kriegsman

[57] ABSTRACT

Transparent, electrically-conductive, ion-blocking layers suitable for use in electrochromic windows. Preferably, one such layer is interposed between the electrochromic layer and its adjacent electron-conductive layer, and another such layer is interposed between the counter-electrode layer and its adjacent electron-conductive layer. Each of the transparent, electrically-conductive, ion-blocking layers comprises an n-type lithium-doped silicon carbide thin film formed by rf diode sputtering. In addition to being suitable for use in electrochromic windows, the n-type lithium-doped silicon carbide thin films of the present invention may also be used in a variety of electronic devices and may be combined, for example, with p-type silicon carbide films, either doped or undoped, in various p-n junction devices, such as LED's, high temperature diodes, etc.

11 Claims, 8 Drawing Sheets

TRANSPARENT, ELECTRICALLY-CONDUCTIVE, ION-BLOCKING LAYER FOR ELECTROCHROMIC WINDOWS

BACKGROUND OF THE INVENTION

The present invention relates generally to electrochromic windows and more particularly to a novel, transparent, electrically-conductive, ion-blocking layer suitable for use in electrochromic windows.

It has been estimated that approximately 40% of the annual national energy consumption is used to control the climate of building interiors, i.e. to heat building interiors in cooler months and to cool building interiors in warmer months. It has also been estimated that, of this amount, approximately 33% is wasted, primarily due to the loss of radiation through building windows. For example, radiation loss occurs on warm days as solar energy is transmitted into building interiors through windows, causing the building interiors to be warmed and, consequently, requiring additional energy to be expended for cooling. Additionally, radiation loss occurs on cool days as thermal infrared radiation present within building interiors escapes through building windows, thereby requiring additional energy to be expended as heat to warm the interiors.

One proposed solution to the problem of radiation loss has involved the use of electrochromic windows having variable absorption. The idea behind such windows is that, by absorbing solar energy, the windows prevent solar energy from entering a building interior and, therefore, from heating the building interior. Unfortunately, however, such windows frequently become very hot as a result of absorbing solar energy. Moreover, the windows ultimately re-radiate approximately 50% of the absorbed energy into or out of the building interior, resulting in thermal transfer inefficiencies.

A second proposed solution to the problem of radiation loss has involved the use of electrochromic windows having variable reflectance over a broad spectral bandwidth of radiation. Using such windows, it is possible, for example, on warm days to transmit the visible portion of the solar spectrum so as to illuminate a building interior while reflecting the ultraviolet and infrared components of the solar spectrum so as to decrease the cooling load and, additionally, on cool days to transmit into the building interior, the entire solar spectrum so as to both illuminate and heat the building interior while reflecting back into the building interior thermal infrared radiation already generated therewithin. Examples of variable reflection electrochromic windows are described in U.S. Pat. Nos. 4,889,414, 4,832,463, 4,876,628 and 5,171,413, all of which are incorporated herein by reference.

According to the teachings of the aforementioned patents, a variable reflection electrochromic window typically comprises a transparent substrate and a thin film, multilayer coating whose transmissivity is adjustable by the transport of electrons and ions therethrough. Typically, the coating includes five layers deposited directly on top of one another, the first layer being a transparent, electrically-conductive layer, the second layer being an electrochromic layer having a spectral selectivity which is adjustable, the third layer being an ion-conductive, electron-resistive layer capable of reversibly transporting positive metal ions into and out of the electrochromic layer so as to transform said electrochromic layer to and from an optically reflective state, the fourth layer being a counter-electrode layer capable of donating and receiving electrons and ions to and from said electrochromic layer, and the fifth layer being a transparent, electrically-conductive layer. As can readily be appreciated, the first and fifth layers function primarily as transparent electrical contacts for dispersing electrons over the surfaces of the second and fourth layers, respectively, and can be omitted from the device, if desired.

Preferably, the first and fifth (i.e., electron conductor) layers are formed from indium tin oxide (ITO); the second (i.e., electrochromic) layer is formed from $WO_3$; the third (i.e., ion-conductor) layer is formed from $Li_2O:Nb_2O_5$; and the fourth (i.e., counterelectrode) layer is formed from $LiCoO_2$. When an externally-generated electric field of the proper polarity is applied to the multilayered structure, lithium ions migrate from the $LiCoO_2$ layer to the $WO_3$ layer and become incorporated into the polycrystalline structure of $WO_3$. The incorporation of lithium ions into the polycrystalline structure of $WO_3$ causes that layer to become "colored," i.e., reflective of certain wavelengths of radiation. In a complementary fashion, the removal of lithium ions from $LiCoO_2$ causes that layer also to become "colored."

Typically, all five of the above-described layers are deposited by a sputtering technique, such as by rf diode sputtering. Problems associated with the deposition of certain of these layers, and refinements which have been to overcome these problems are discussed in several of the above-identified U.S. patents.

Another type of problem associated with variable reflection electrochromic windows of the type described above is that, upon the application of a voltage required for electron transfer, the positive (e.g., lithium) ions have a tendency to migrate from the electrochromic and counter-electrode layers to the outer, electron conductor (ITO) layers and/or to irreversibly react with atmospheric gases surrounding the device, thereby causing a depletion of the necessary quantity of lithium ions in the device. Thus depleted, the electrochromic and counter-electrode layers are prevented from functioning in their intended manner.

One approach to this problem has been to insert transparent, electrically-conductive, ion-blocking layers between the first (ITO) and second (electrochromic) layers and the fourth (counter-electrode) and fifth (ITO) layers of the above-described multilayer coating. This approach, which is described in U.S. Pat. No. 5,133,594, also incorporated herein by reference, is said to involve using zinc oxide, Cadmium oxide or silicon carbide as the transparent, electrically-conductive, ion-blocking layers.

Although the present inventors have found that zinc oxide, cadmium oxide and silicon carbide, when used in the manner described in U.S. Pat. No. 5,133,594, are generally satisfactory at blocking the migration of lithium ions, the present inventors have also found that these layers are not sufficiently electrically-conductive, thereby resulting in electrochromic windows with very poor transmissivity switching behavior—very slow switching and/or relatively high voltages needed for switching.

SUMMARY OF THE INVENTION

Accordingly, it is an object of the present invention to provide a transparent, electrically-conductive, ion-blocking layer suitable for use in electrochromic windows which layer overcomes the aforementioned problems noted in connection with existing transparent, electrically-conductive, ion-blocking layers.

It is another object of the present invention to provide a transparent, electrically-conductive, ion-blocking layer of the type described above which can be easily fabricated.

In accordance with the foregoing objects and other objects which may be hereinafter described, a transparent, electrically-conductive, ion-blocking layer of the type described above is provided, the layer comprising a thin film of n-type lithium-doped silicon carbide.

According to a preferred embodiment of the present invention, said thin film of n-type lithium-doped silicon carbide may be fabricated by placing one or more pellets of $Li_2CO_3$ on a solid silicon carbide target and rf diode sputtering the target onto a suitable substrate. Alternatively, one could fabricate said thin film of n-type lithium-doped silicon carbide using a silicon carbide target and a $Li_2CO_3$ target by co-sputtering from the two targets, each target having its own power supply and gun.

As can readily be appreciated, in addition to being used as a transparent, electrically-conducting, ion-blocking layer in an electrochromic window, thin films of n-type lithium-doped silicon carbide fabricated in the manner described above may also be used in a variety of electronic devices and may be combined, for example, with p-type silicon carbide films, either doped or undoped, in various p-n junction devices, such as LED's, high temperature diodes, etc.

The teachings of the present invention could also be applied to developing a voltage or charge indicator for batteries. The indicator would comprise an electrochromic window having a layer of silicon carbide which has been appropriately doped to a desired resistivity. The battery to be tested would be used to change the electrochromic window between a colored state and a bleached state. In this manner, if the voltage or charge of the battery being tested is too low, it will not be able to change the electrochromic window between a colored state and a bleached state in a reasonable period of time.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF PREFERRED EMBODIMENTS

Figure 1:
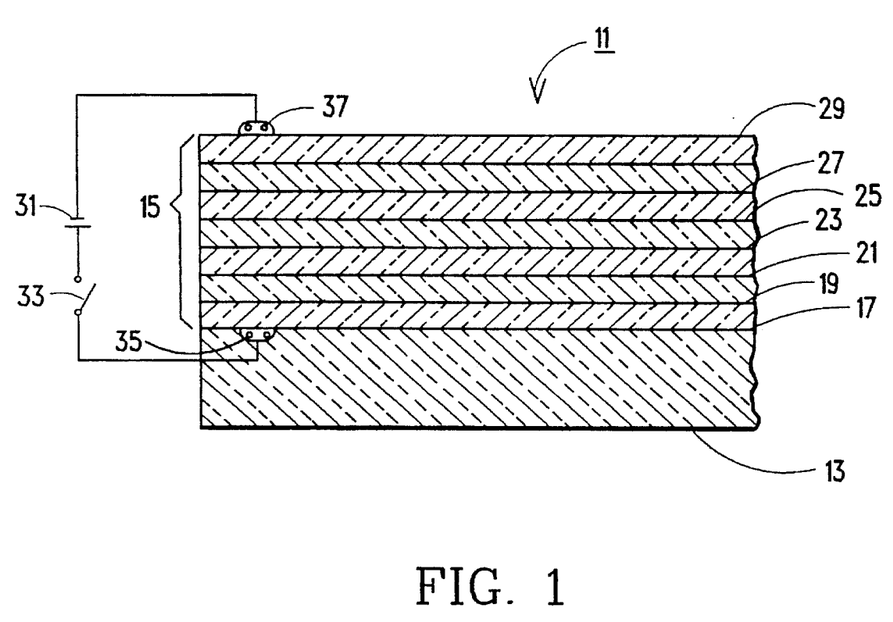
FIG. 1 is a schematic, cross-sectional view of one embodiment of an electrochromic window constructed according to the teachings of the present invention, the electrochromic window being shown electrically coupled through a switch to a power source.

Referring now to the drawings and more particularly to FIG. 1, there is shown a schematic, cross-sectional view of one embodiment of an electrochromic window constructed according to the teachings of the present invention, the electrochromic window being represented generally by reference numeral 11.

Window 11 includes a transparent substrate 13. Substrate 13 may be made of glass, in which case window 11 may be used to replace a plate glass window which has already been installed in a building or vehicle or may be placed next to such a window, or may be made of a thin, flexible plastic, in which case window 11 may be adhered either to the interior or to the exterior of an already installed plate glass window. If substrate 13 is made of glass, it preferably includes a sodium barrier layer.

Window 11 also includes a thin film, multilayer coating 15 formed on top of substrate 13. In the embodiment shown, coating 15 is a seven-layer coating which includes, as the first or bottom layer, a first transparent, electron-conductive layer 17. Layer 17 may be made, for example, of indium tin oxide (ITO), doped tin oxide or doped zinc oxide. Preferably, layer 17 has a thickness of about 1000–1800 Angstroms.

A first transparent, electron-conductive, ion-blocking layer 19 forms the second layer of coating 15. As will be further explained below, layer 19 is preferably an n-type lithium-doped silicon carbide thin film, preferably having a thickness of about 200–300 Angstroms.

An ion-conductive, electron-conductive, electrochromic layer 21 forms the third layer of coating 15. Layer 21, which is preferably made of $WO_3$, is an insertion host which undergoes reversible lithium ion insertion with an accompanying change in color. Preferably, layer 21 has a thickness of about 1000–1800 Angstroms.

An ion-conductive, electron-resistive layer 23 forms the fourth layer of coating 15. Layer 23, which may be made of an amorphous, stoichiometric mixture of lithium oxide and one or more metal oxides, such as tantalum oxide and niobium oxide, preferably has a thickness of about 3000–5000 Angstroms.

An ion-conductive, electron-conductive, counter-electrode layer 25 forms the fifth layer of coating 15. Layer 25 includes one or more compounds of the formula $Li_yMO_2$ wherein M is a transition metal of the third, fourth or fifth row of the periodic table. Preferably, layer 25 is made of stoichiometric $LiCoO_2$ and has a thickness of about 1000–3000 Angstroms.

A second transparent, electron-conductive, ion-blocking layer 27 forms the sixth layer of coating 15. Layer 27 is identical in composition to layer 27 and also preferably has a thickness of about 200–300 Angstroms.

A second transparent, electron-conductive layer 29 forms the seventh or top layer of coating 15. Layer 29 is identical in composition to layer 17 and preferably has a thickness of about 800–2000 Angstroms.

To control the flow of lithium ions between layers 21 and 25 when window 11 is in use, a reversible, low voltage (i.e., preferably less than about 10 volts and more preferably less than about 3 volts) power source 31 is coupled through a switch 33 to a pair of electrodes 35 and 37 mounted on layers 17 and 29, respectively.

The deposition of layers 17, 21, 23, 25 and 29 may be achieved in the manner generally described in U.S. Pat. No. 5,171,413, and/or in any of the other patents incorporated herein by reference. The deposition of layers 19 and 27 may be achieved in the manner set forth below in Example I.

EXAMPLE I

Nine $Li_2CO_3$ disk-shaped pellets, each pellet having a diameter of 12 mm, were evenly distributed over the surface of a solid silicon carbide target having a surface area of 100 cm$^2$. The substrate was positioned above the silicon carbide target in a sputtering-up geometry, the target and substrate separated by a distance of 7 cm. Rf power was then applied to the target at a power level of 200 W for 3 minutes under a pressure of 3 mT of Arigon, resulting in a deposition of an n-type lithium-doped silicon carbide film having a thickness of approximately 200 Angstroms. The conductivity type of the deposited film was confirmed by a thermopower measurement. The resistivity of the deposited film was determined to be 20 Ω cm by measuring the resistance of the film soldered between two strips of Indium. (To lower the resistivity of the film, one could increase the amount of dopant incorporated into the film, e.g., by using additional $Li_2CO_3$ pellets.)

An alternative method for depositing an n-type lithium-doped silicon carbide thin film is to use two separate targets (SiC and $Li_2CO_3$, respectively) and guns and to co-sputter from the two, each having its own power supply. In this manner, the degree of sputtering can be controlled, for example, to obtain dopant gradients, if such is desired. Also, instead of using $Li_2CO_3$ as a target material, other lithium sources, such as $Li_2O$ and $Li_3N$, could be used.

EXAMPLE II

A pair of electrochromic windows were fabricated. The first of the electrochromic windows had a five-layer coating (similar to that shown in FIG. 1 of U.S. Pat. No. 5,171,413), which coating did not include any n-type lithium-doped silicon carbide ion-blocking layers of the present invention. The second of the electrochromic windows had a six-layer coating, which coating differed from the aforementioned five-layer coating only in that it additionally included an n-type lithium-doped silicon carbide layer (made in the manner described in Example I and having a thickness of approximately 22 nm) interposed between the electrochromic layer and its adjacent transparent electron-conductive layer.

Figure 2A:
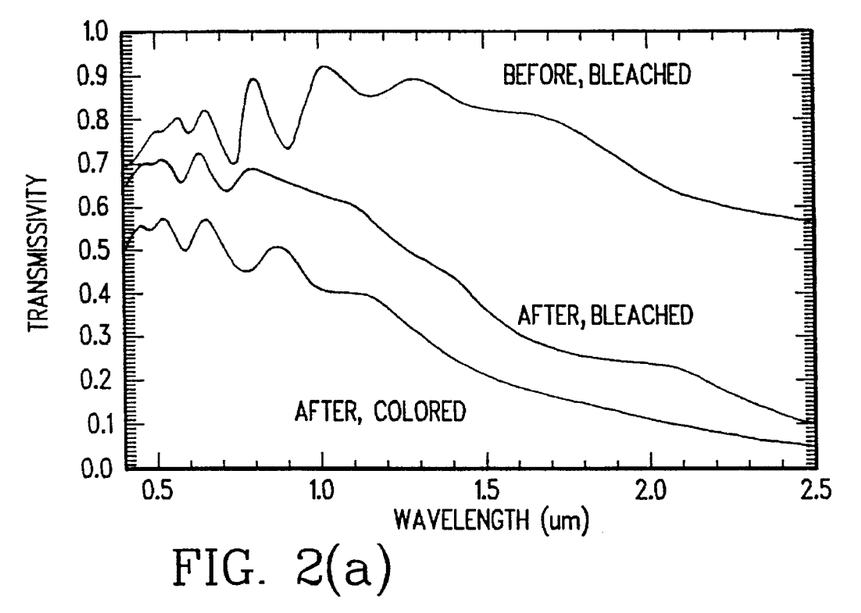
FIGS. 2(a) and 2(b) are the respective transmission spectra, both before and after cycling, of an electrochromic window which does not include an n-type lithium-doped silicon carbide layer and of an electrochromic window which does include an n-type lithium-doped silicon carbide layer interposed between its electrochromic layer and the adjacent electron-conducting layer.
Figure 2B:
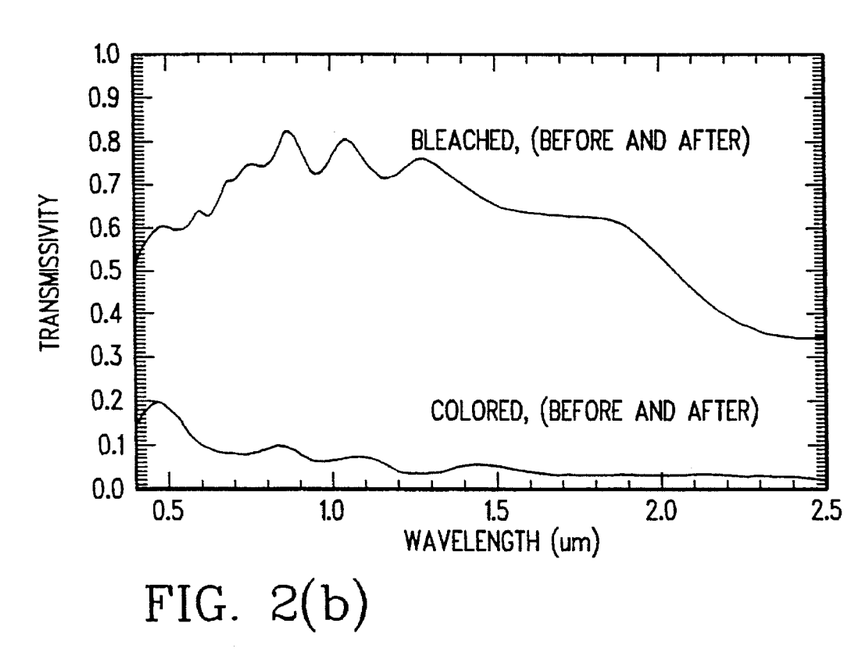

Both electrochromic windows were continuously cycled at 60° C. in Ar atmosphere between the bleached and colored states, the first electrochromic window being cycled for 9,000 cycles, and the second electrochromic window being cycled for 18,000 cycles. The transmission spectra of the first and second electrochromic windows, both before and after cycling, are shown in FIGS. 2(a) and 2(b), respectively. As can be seen from the transmission spectra, the electrochromic window containing the n-type lithium-doped silicon carbide layer exhibited no deterioration of the transmission modulation after 18,000 cycles and exhibited a very low transmission in the colored state whereas the electrochromic window lacking the n-type lithium-doped silicon carbide layer dramatically deteriorated in its optical transmission modulation after 9,000 cycles. These results are consistent with the inventors' belief that an n-type lithium-doped silicon carbide layer can be used to prevent the depletion of lithium ions from an electrochromic window.

Figure 3:
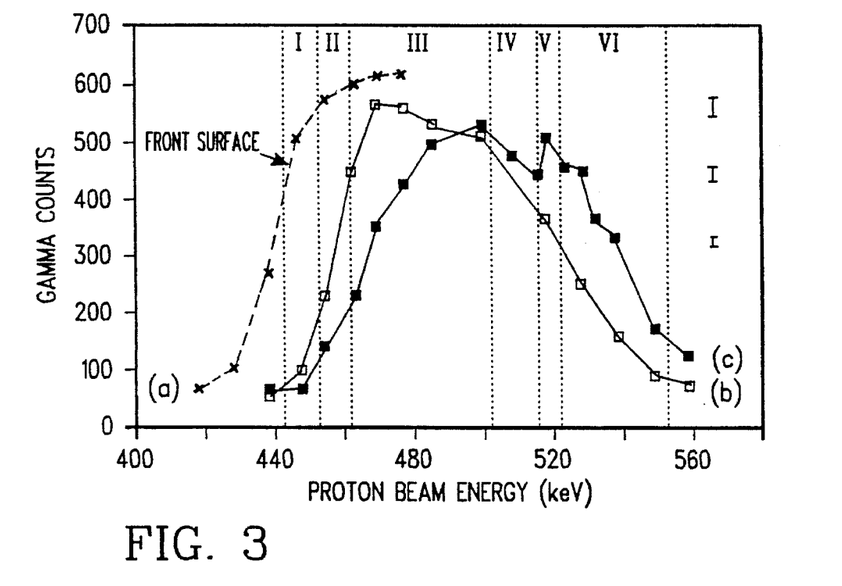
FIG. 3 is a graphic representation of the results of a nuclear reaction analysis technique performed on an electrochromic window containing an n-type lithium-doped silicon carbide layer interposed between its electrochromic layer and the adjacent electron-conducting layer position of layers: I=$In_2O_3$; II=$LiCoO_3$; III=$LiNbO_3$; IV=$WO_3$; V=SiC; and VI=ITO).

To estimate the Li concentration profile in each of the layers of the electrochromic window containing the n-type lithium-doped silicon carbide layer, a nuclear reaction analysis technique using the p,y reaction, $^7Li(p,y)^8Be$, occurring at approximately 440 keV (half-width≈12 keV), was performed. The resultant Li profiles, both for a bleached state (curve b) and for a colored state (curve c), as well as for a reference crystal of $LiNbO_3$ (curve a), are shown in FIG. 3. These results indicate that lithium "piled up" in the region of the doped silicon carbide layer, providing further evidence for the effectiveness of the layer as a lithium block.

EXAMPLE III

A p-type undoped silicon carbide thin film was fabricated using essentially the same technique described above in Example I, the only difference between the two techniques being that, in the present technique, no $Li_2CO_3$ pellets were placed on the silicon carbide target. The conductivity type of the deposited film was confirmed by a thermopower measurement. The resistivity of the deposited film was determined to be 100 Ω cm by measuring the resistance of the film soldered between two strips of Indium.

EXAMPLE IV

To observe and compare the $Li^+$-blocking properties of n-type and p-type silicon carbide films of the type made above in Examples I and III, respectively, the following experiment was performed: First, the following multilayer structures were fabricated: (a) [glass substrate/indium tin oxide (ITO)/tungsten trioxide ($WO_3$)]; (b) [glass substrate/ITO/$WO_3$/SiC(n-type)]; and (c) [glass substrate/ITO/$WO_3$/SiC(p-type)]. The thicknesses of the silicon carbide layers in structures (b) and (c) were about 22 nm, as estimated by deposition rate and calibration from a much thicker film. The ITO and $WO_3$ films in structures (a), (b) and (c) were deposited using ITO and $WO_3$ targets on substrates heated to 440° C. in an $O_2$ atmosphere of 10 mT through a distance of 7 cm over one hour at an rf power density of 1.6 W/cm².

Next, potentiostatic measurements were performed on each structure in a 1 molar solution of lithium perchlorate ($LiClO_4$) in propylene carbonate with a carbon counter electrode. The ITO layer was negatively biased relative to the carbon counter electrode, and current was measured with a Princeton Applied Research 362 scanning potentiostat. The spectral transmission traces, obtained before and after the application of a −1 V potential step, for structures (a), (b) and (c) are shown in FIGS. 4(a), 4(b) and 4(c), respectively, and the corresponding current density transients for the three structures are shown in FIGS. 5(a), 5(b) and 5(c), respectively.

Figure 4A:
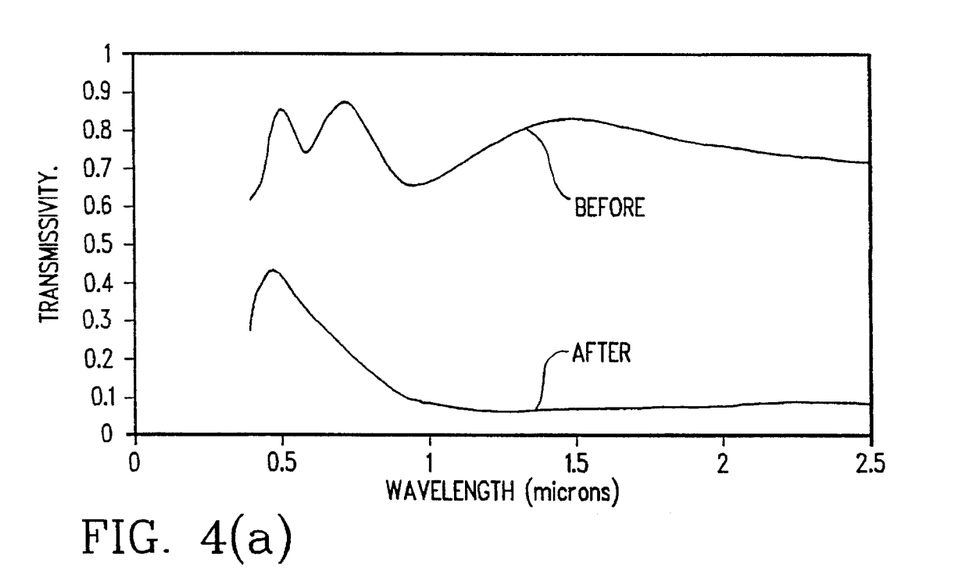
FIGS. 4(a) through 4(c) are transmission spectra of [glass/ITO/$WO_3$], [glass/ITO/$WO_3$/SiC(n-type)] and [glass/ITO/$WO_3$/SiC(p-type)] structures, respectively, obtained before and after applying a potential step of −1 V relative to a graphite counter electrode in a 1 molar solution of $LiClO_4$ in propylene carbonate.
Figure 4B:
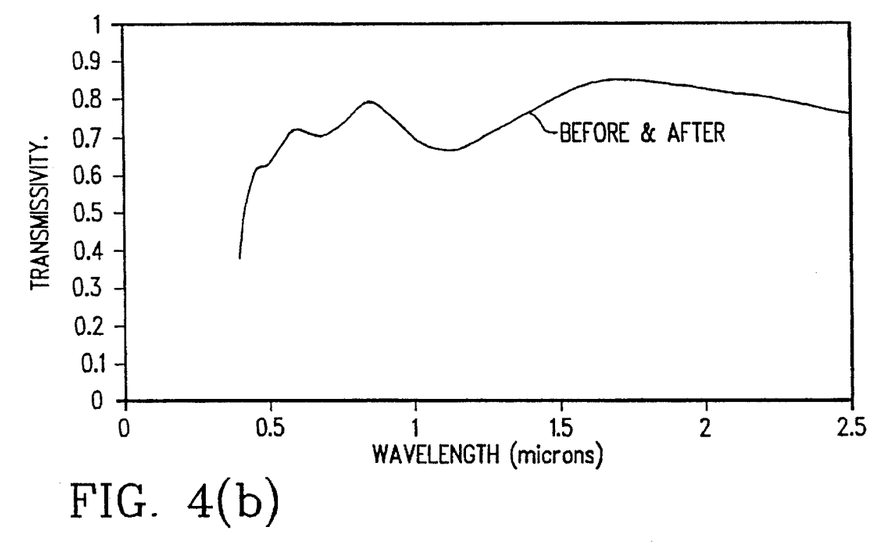
Figure 4C:
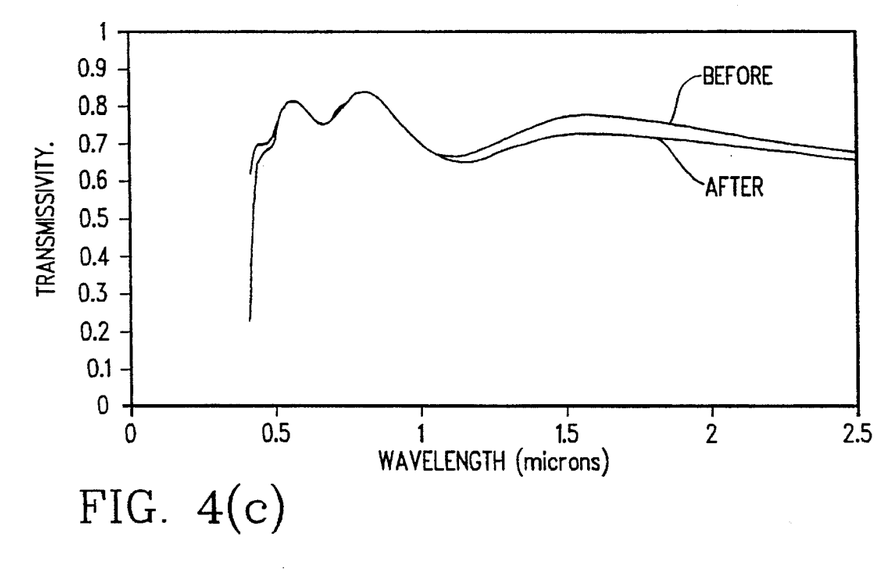
Figure 5A:
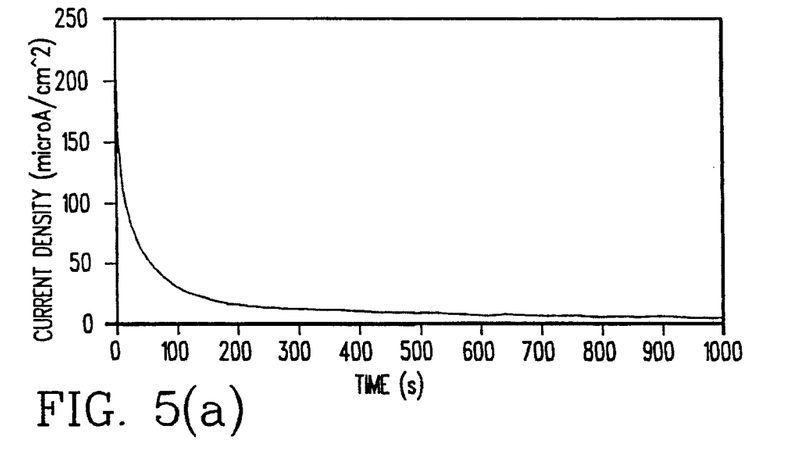
FIGS. 5(a) through 5(c) are the corresponding current density transients for the structures of FIGS. 4(a) through (c), respectively.
Figure 5B:
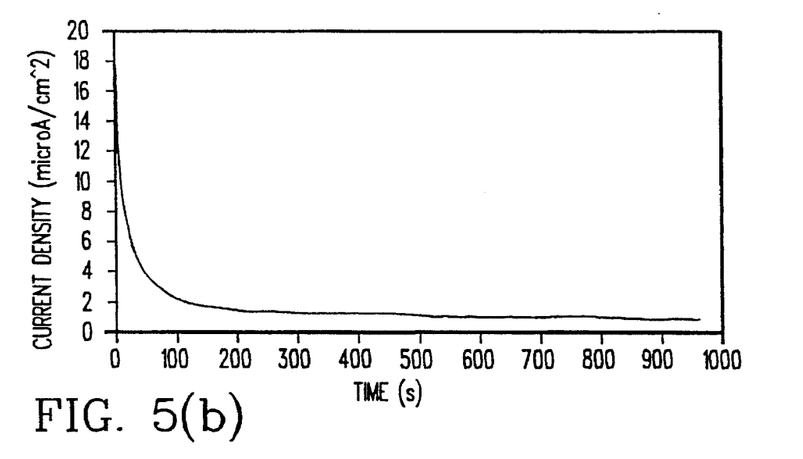
Figure 5C:
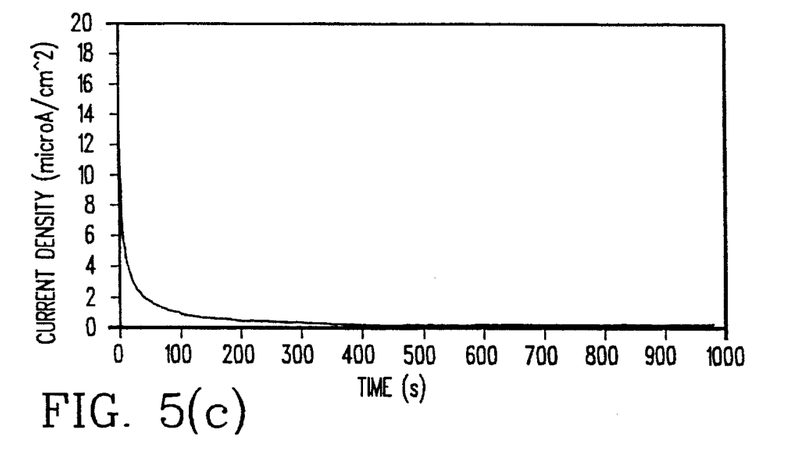

As can be seen in FIG. 4(a), a substantial transmission drop occurred for the [glass/ITO/$WO_3$] structure, clearly indicating the insertion of a relatively large amount of $Li^+$ into the $WO_3$ layer during the electrochemical test. In addition, a transmission drop of about 3% in the spectral range of about 1000–2500 nm was observed for the [glass/ITO/$WO_3$/SiC(p-type)] structure (see FIG. 4(c)). In contrast, no transmission drop was observed for the [glass/ITO/$WO_3$/SiC(n-type)] structure (see FIG. 4(b)). Referring to FIGS. 5(a) through 5(c), it can be seen that the currents for structures (b) and (c) were considerably suppressed (greater than ten times) compared to the current for the sample with $WO_3$ in direct contact with the electrolyte. Thus, it can be deduced that both the n-type and p-type SiC layers effectively blocked $Li^+$, the n-type SiC layer performing better than the p-type SiC layer.

EXAMPLE V

To obtain an estimate of the electron transport properties of n-type and p-type silicon carbide films of the type made above in Examples I and III, respectively, the following experiment was performed: First, the following multilayer structures were fabricated: (a) [glass substrate/indium tin oxide (ITO)/SiC(n-type)/tungsten trioxide ($WO_3$)]; (b) [glass substrate/ITO/SiC(p-type)/$WO_3$]; (c) [glass substrate/ITO/SiC(n-type)/lithium cobalt oxide($LiCoO_2$)]; and (d) [glass substrate/ITO/SiC(p-type)/lithium cobalt oxide($LiCoO_2$)]. The SiC, ITO and $WO_3$ layers were deposited in the same manner as in Example IV. The $LiCoO_2$ layers were deposited using a $LiCoO_2$ target in $O_2$ atmosphere of 10 mT, through a distance of 6 cm for a duration of 20 minutes. The substrates were at ambient temperature, and the rf power density was 0.8 W/cm².

Next, two successive potential steps with negatively and positively biased ITO were applied to the samples under the same conditions described above in Example IV, and optical transmission traces were obtained before and after each step. The optical transmission traces for the four above-described structures are shown in FIGS. 6(a) through 6(d), respectively, and a pair of current density transients corresponding to each structure are shown in FIGS. 7(a) and 7(b) through FIGS. 10(a) and 10(b), respectively.

Figure 6A:
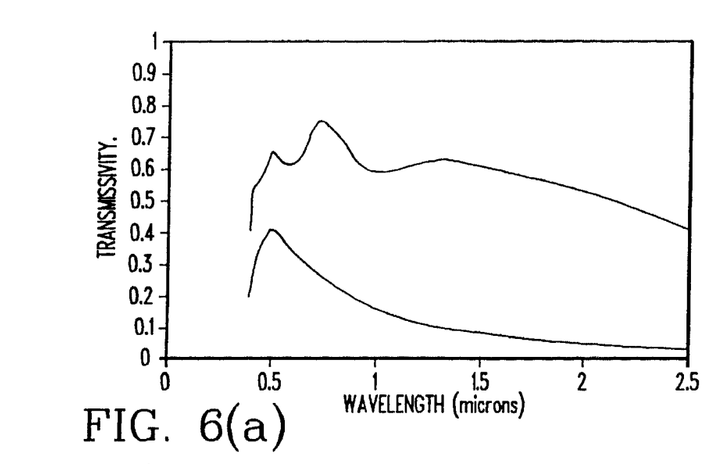
FIGS. 6(a) through 6(d) are transmission spectra of the following structures: (a) [glass substrate/indium tin oxide (ITO)/SiC(n-type)/tungsten trioxide ($WO_3$)], (b) [glass substrate/ITO/SiC(p-type)/$WO_3$], (c) [glass substrate/ITO/SiC(n-type)lithium cobalt oxide($LiCoO_2$)] and (d) [glass substrate/ITO/SiC(p-type)lithium cobalt oxide($LiCoO_2$)], respectively, obtained before and after applying two successive potential steps of −1 V and +1 V relative to a graphite counter electrode in a 1 molar solution of $LiClO_4$ in propylene carbonate.
Figure 6B:
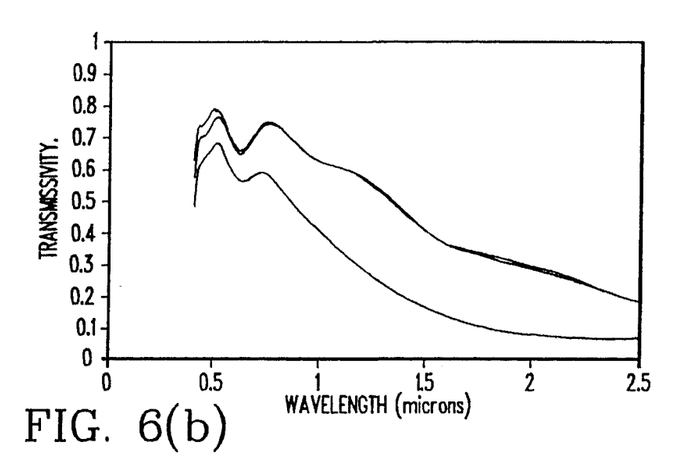
Figure 6C:
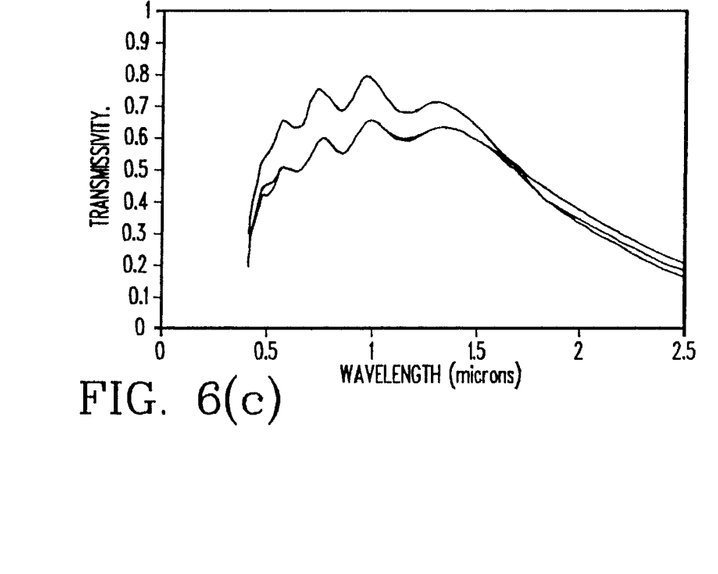
Figure 6D:
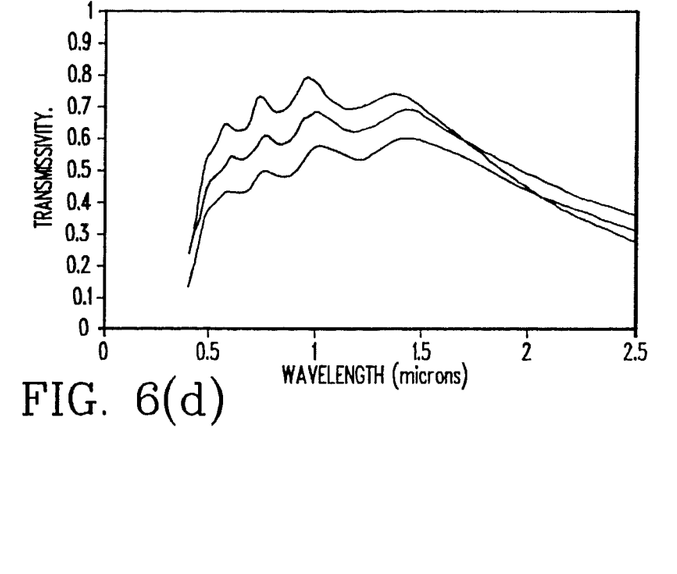
Figure 7A:
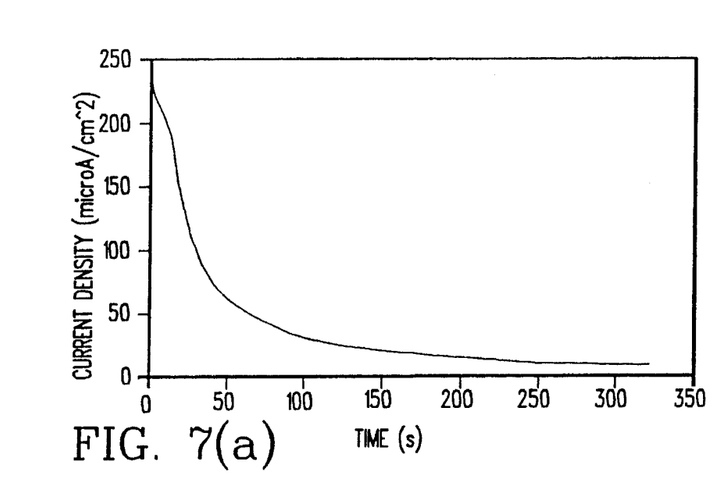
FIGS. 7(a) and 7(b) are the corresponding current density transients for structure (a)
Figure 7B:
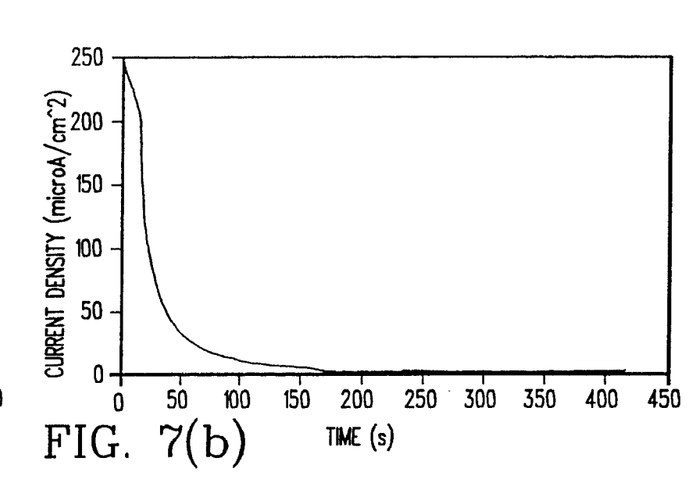
Figure 8A:
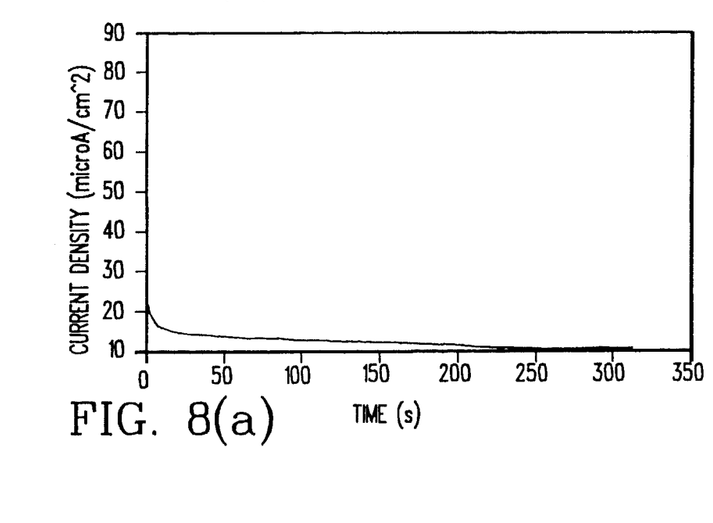
FIGS. 8(a) and 8(b) are the corresponding current density transients for structure (b)
Figure 8B:
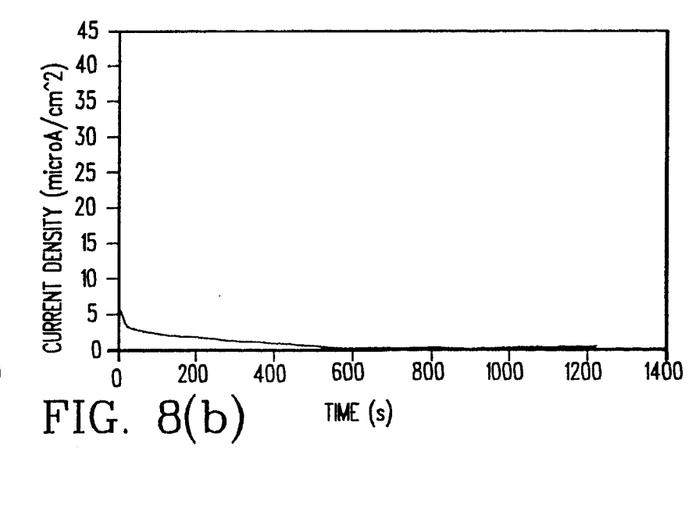
Figure 9A:
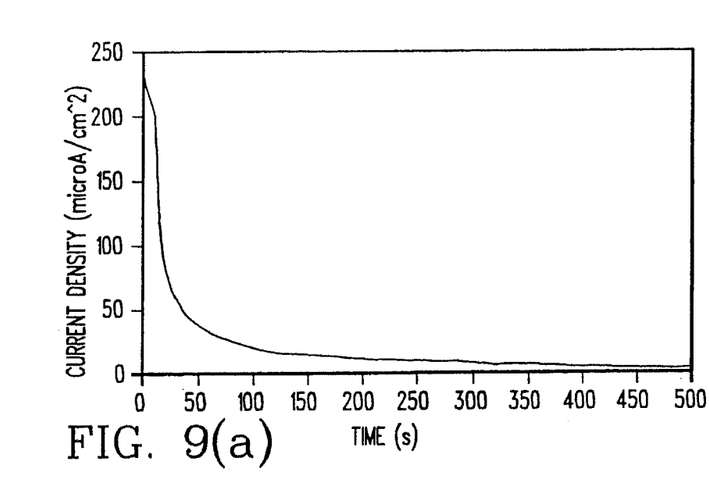
FIGS. 9(a) and 9(b) are the corresponding current density transients for structure (c)
Figure 9B:
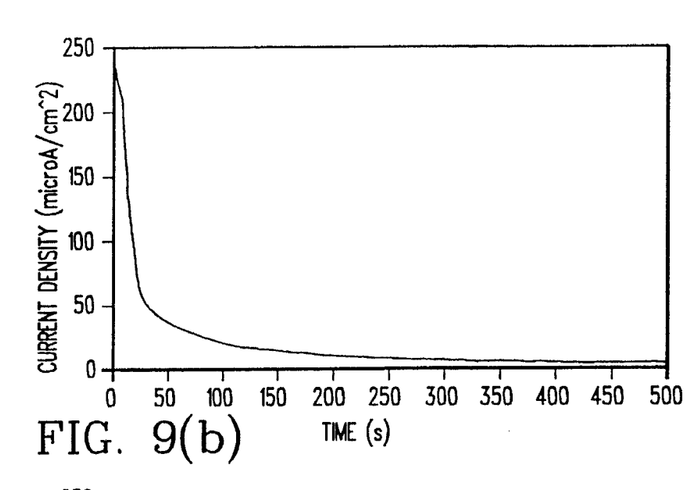
Figure 10A:
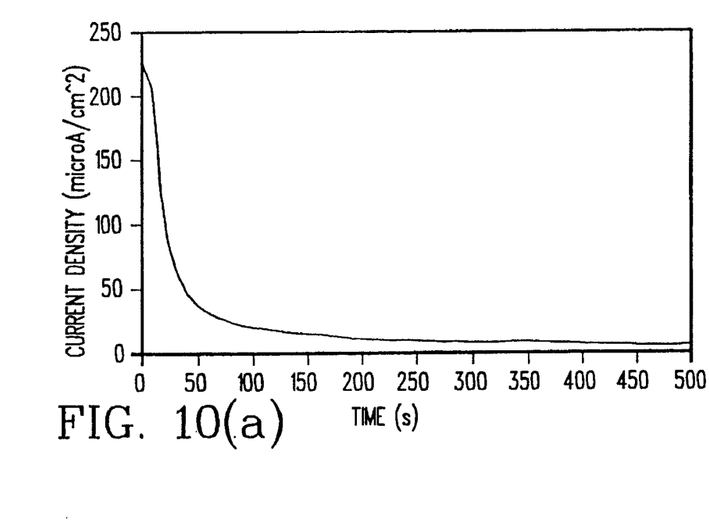
FIGS. 10(a) and 10(b) are the corresponding current density transients for structure (d).
Figure 10B:
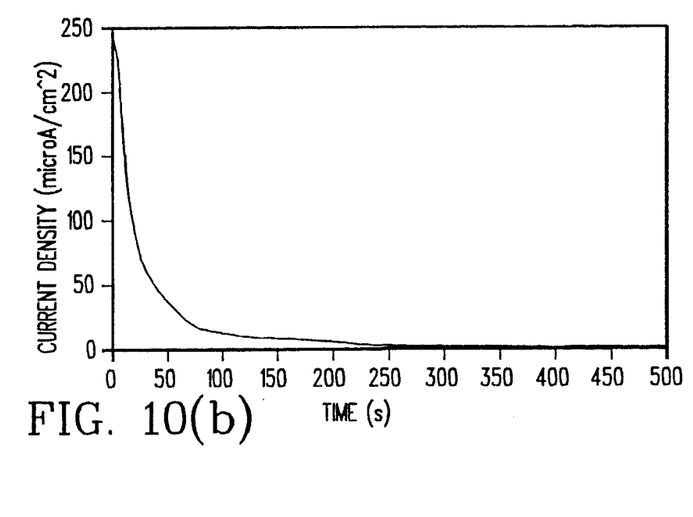

The electrochemical measurements performed on structures (a) and (b) showed that both of their transmissions could be reversibly modulated (see FIGS. 6(a) and 6(b)). This modulation suggested that approximately the full amount of $Li^+$ which had been inserted into the $WO_3$ layer could be removed. However, comparing FIGS. 7(a) and 7(b) to 8(a) and 8(b), one can see that the currents obtained using structure (a) were much larger than those obtained using structure (b). Therefore, one can deduce that the n-type SiC layer provided much better electron transport than the p-type SiC layer. This disparity can be explained by viewing the ITO/p-type SiC/$WO_3$ portion of structure (b) under an n-p-n model. In other words, the ITO/p-type SiC interface (or the p-type SiC/$WO_3$ interface) behaved as a reverse biased p-n junction when the ITO layer was positively (or negatively) biased relative to the counter electrode. Thus, electronic injection into the $WO_3$ was suppressed in the ITO/p-type SiC/$WO_3$ cell. This restriction of current explains the better transmission modulation for structure (a) than for structure (b) (i.e., 40–50% vs. 10–15%, respectively) over the 400–2500 nm range for the same time and applied voltage.

The electrochemical measurements performed on structures (c) and (d) indicated reversible transmission modulation for both structures. However, whereas structure (c) returned to its initial state of transmission after applying two successive voltage steps of different polarity thereto, structure (d) had a higher transmission after application of the voltage steps than before. This disparity can also be explained by the junction barrier model. When negative voltage was applied to structure (c), electrons were injected into the $LiCoO_2$ layer, thereby lowering the n-type SiC/$LiCoO_2$ potential barrier. Since the potential barrier was lowered after the first voltage step (−1 V), hole injection was easier through the n-type SiC/$LiCoO_2$ interface following the application of reversed voltage (+1 V). This model was confirmed by the fact that integrated currents were balanced within 5% for two potential steps (see FIGS. 9(a) and 9(b)). For structure (d), the p-type SiC/$LiCoO_2$ potential barrier increased after electron injection into the $LiCoO_2$ layer. The hole injection for reversed voltage was, therefore, more difficult. This can be seen from FIGS. 10(a) and 10(b) where the integrated charge for the voltage step of +1 V was 20% less than the integrated charge for the voltage step of +1 V for the same amount of time. The differences in transmission before and after the potentiostatic test was in agreement with the charge balance.

As can be seen from the foregoing examples, n-type SiC layers exhibited better electron transport than p-type SiC layers. This is believed to be due to junction barrier lowering.

Alternative applications of the technology described above are p-n junction LED's and high temperature diodes.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. An electrochromic window comprising:

(a) a transparent substrate;

(b) a first transparent, electron-conducting layer on said transparent substrate;

(c) an electrochromic layer on said first transparent, electron-conducting layer;

(d) an ion-conductive, electron-resistive layer on said electrochromic layer;

(e) a counter-electrode layer on said ion-conductive, electron-resistive layer;

(f) a second transparent, electron-conducting layer on said counter-electrode layer; and (g) a first transparent, electron-conducting, ion-blocking layer interposed between said first transparent, electron-conducting layer and said electrochromic layer or between said counter-electrode layer and said second transparent, electron-conducting layer, said first transparent, electron-conducting, ion-blocking layer being an n-type silicon carbide thin film.

2. The electrochromic window as claimed in claim 1 wherein said first transparent, electron-conducting, ion-blocking layer is an n-type, lithium doped silicon carbide thin film.

3. The electrochromic window as claimed in claim 2 wherein said first transparent, electron-conducting, ion-blocking layer is interposed between said first transparent, electron-conducting layer and said electrochromic layer.

4. The electrochromic window as claimed in claim 3 further comprising a second transparent, electron-conducting, ion-blocking layer, said second transparent, electron-conducting, ion-blocking layer being interposed between said counter-electrode layer and said second transparent, electron-conducting layer.

5. The electrochromic window as claimed in claim 2 wherein said first transparent, electron-conducting, ion-blocking layer is interposed between said second transparent, electron-conducting layer and said counterelectrode layer.

6. The electrochromic window as claimed in claim 2 wherein said first and said second transparent, electron-conducting layers are made of indium tin oxide, said electrochromic layer is made of $WO_3$, said counterelectrode is $LiCoO_2$ and said ion-conductive, electron-resistive layer is made of an amorphous, stoichiometric mixture of lithium oxide and one or more metal oxides.

7. An article of manufacture for use in an electrochromic window, said article of manufacture comprising:

(a) an electrochromic layer;

(b) an ion-conductive, electron-resistive layer on said electrochromic layer;

(c) a counter-electrode layer on said ion-conductive, electron-resistive layer; and (d) a first transparent, electron-conducting, ion-blocking layer, said first transparent, electron-conducting, ion-blocking layer being positioned either directly under said electrochromic layer or directly on top of said counter-electrode layer, said first transparent, electron-conducting, ion-blocking layer being an n-type silicon carbide thin film.

8. The article of manufacture as claimed in claim 7 wherein said first transparent, electron-conducting, ion-blocking layer is an n-type lithium doped silicon carbide thin film.

9. The article of manufacture as claimed in claim 8 wherein said first transparent, electron-conducting, ion-blocking layer is positioned directly under said electrochromic layer.

10. The article of manufacture as claimed in claim 9 further comprising a second transparent, electron-conducting, ion-blocking layer positioned directly on top of said counter-electrode layer, said second transparent, electron-conducting, ion-blocking layer being an n-type lithium doped silicon carbide thin film.

11. The article of manufacture as claimed in claim 10 further comprising a first transparent, electron-conductor layer positioned directly under said first transparent, electron-conducting, ion-blocking layer and a second transparent, electron-conductor layer positioned directly on top of said second transparent, electron-conducting, ionblocking layer.

* * * * *